April 13, 1926.  LE ROY H. CRANDALL  1,580,963
COUPLING FOR METAL LINED HOSE
Filed May 7, 1924

Inventor.
LeRoy H. Crandall
by Heard Smith & Tennant
Attys.

Patented Apr. 13, 1926.

1,580,963

UNITED STATES PATENT OFFICE.

LE ROY H. CRANDALL, OF BOSTON, MASSACHUSETTS.

COUPLING FOR METAL-LINED HOSE.

Application filed May 7, 1924. Serial No. 711,627.

*To all whom it may concern:*

Be it known that I, LE ROY H. CRANDALL, a citizen of the United States, and resident of Boston, county of Suffolk, State of Massachusetts, have invented an Improvement in Couplings for Metal-Lined Hose, of which the following description, in connection with the accompanying drawing, is a specification, like characters on the drawing representing like parts.

This invention relates to a coupling for metal lined hose of that type in which the hose comprises preferably an exterior tube of rubber and fabric and an interior metal lining and in which the metal lining is formed by a helical winding of a strip of metal of substantially S-shape in cross section so arranged that the successive coils interlock with one another and in which a rubber strip is wound with the strip of metal thus insuring a gas and liquid tight joint between the successive coils. Such a hose is flexible, is wear resisting and durable, and is thoroughly gas and liquid tight. It is thus utilizable for many purposes and is particularly desirable, for example, in distributing gasoline and volatile liquids.

The object of the present invention is to provide a coupling for this type of metal lined hose which will insure an equally gas and liquid tight joint between the coupling and the hose.

The object of the invention is further to provide such a coupling which may readily be attached to the hose and which may readily be removed therefrom when it is desired to repair the hose or change the position of the coupling.

These and other objects and features of the invention will appear more fully from the accompanying description and drawings and will be particularly pointed out in the claims.

Figure 1:
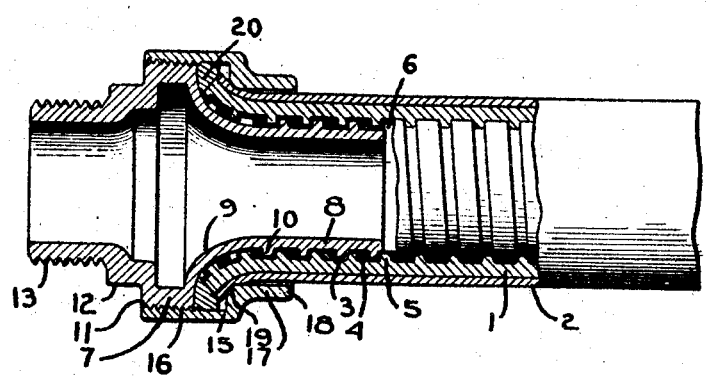
Fig. 1 is a view in longitudinal cross section and partially in elevation of a section of metal lined hose and a coupling embodying a preferred form of the present invention united to the hose.

The coupling of this invention is designed for use in connection with a particular type of metal lined hose. In this type of hose the main body of the hose is composed of a cylindrical core 1 of rubber or rubber compound and an exterior covering 2 of fabric. The core and covering are vulcanized or suitably united together thus forming a very tough durable and wear resisting hose. In order to insure that the hose shall be gas and liquid tight it is provided with a metal lining. This lining is formed from a strip of metal, the cross section of which is substantially that of an elongated S as shown at 3 in Fig. 1. This strip of metal is wound helically so that the successive coils interlock with one another and where these coils interlock there is interposed a packing strip 4 of rubber or suitable material so that a gas and liquid tight joint is formed between the successive coils. Furthermore the metal lining is forced into the rubber portion 1 of the hose so that a rib 5 of the rubber projects into the exterior surface of the metal lining.

There is thus formed a type of hose of a highly durable and wear resisting character which is gas and liquid tight and which is not subject to deterioration from gas or liquids which would attack the material of the hose except for the metal lining. The construction of the metal lining thus leaves at the interior surface of the hose a continuous helical or screw thread like groove 6 running throughout the length of the hose. It is this type of hose for which the present coupling is designed and it is the object of the present invention to provide a coupling which may readily and easily be attached to the hose and removed therefrom and which will insure a gas and liquid tight connection between the coupling and the hose.

Figure 2:
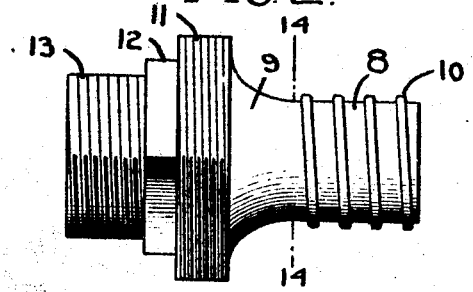
Fig. 2 is an elevation of one of the coupling members shown in Fig. 1.
Figure 3:
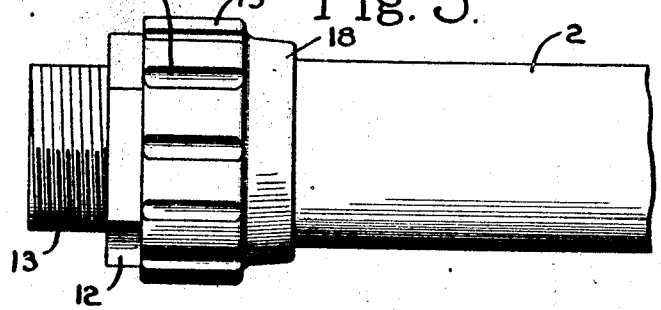
Fig. 3 is a side elevation of the coupling and hose shown in Fig. 1.

The coupling comprises two members, namely, a main member shown separately in a preferred form in Fig. 2 and a collar co-operating therewith.

The main member of the coupling comprises essentially a body portion 7, a cylindrical sleeve section 8 and an intermediate section 9 integrally uniting the body and cylindrical sleeve sections.

The cylindrical sleeve section 8 is externally screw threaded at 10 and is of such a size as to fit easily the metal lining of the hose, the exterior surface of the sleeve 8 being an easy fit in the metal lining of the hose and the screw threaded portion 10 being an easy fit in the screw thread like groove 6 of the metal lining. This enables the cylindrical sleeve to be screwed into the end of any section of hose.

The body section 7 is of greater diameter than the sleeve 8 and is externally screw threaded at 11. The shape of the body at the opposite end from the sleeve 8 will depend upon the nature of the coupling. For convenience it is shown as presenting first a polygonal section 12 to receive a wrench and next a screw threaded section 13 for attachment to a union.

The intermediate section 9 which integrally unites the body 7 with the sleeve 8 is concentric with both and has its exterior surface extending in a smooth flare from the sleeve to the body. In the preferred form of construction shown the cylindrical exteriorly screw threaded sleeve 8 terminates about at the line 14 and the flare of the intermediate section 9 begins at this line and spreads outwardly into the body.

The other member of the coupling is the collar 15. This collar has one end section 16 interiorly screw threaded to fit the externally screw threaded portion 11 of the body of the main coupling member. The opposite end section 17 of the collar presents a smooth and substantially cylindrical interior surface which at the extreme end 18 is of such a diameter as to fit loosely over the exterior of the hose. This collar is also provided between the screw threaded section 16 and the section 17 with an annular shoulder presenting a rounded corner 19. A suitable sealing washer or packing 20 is placed on the main coupling member so that when the coupling members are in place on the hose this sealing washer 20 is clamped between the body 7 of the main coupling member and the end of the hose, the collar at the rounded corner 19 gripping the hose and forcing it against the sealing washer. The exterior surface of the collar is shown as provided with longitudinal ribs 21 enabling it to be gripped by a wrench or a spanner.

In applying the coupling the collar 15 is first slipped on over the hose. A sealing washer 20 is placed on the main coupling member and it is then screwed into the end of the hose. After the exteriorly screw threaded sleeve 8 has entered the hose this main coupling member is forced in by a wrench applied at 12. As the coupling member is thus screwed into the hose the extreme end of the hose is forced up on the exterior flare of the intermediate section 9 and is thus expanded into a snug fit against the coupling member and forced up against the sealing washer 20. The collar 15 is then slid along the hose until its threaded section engages the exteriorly threaded portion 11 of the body of the main coupling member. Then the collar is screwed up forcing the rounded corner 19 into the expanded portion of the hose and clamping it against the section 9 of the main coupling member and forcing the end of the hose against the sealing washer and in turn the sealing washer firmly against the body. Thus a perfect gas or liquid tight joint is formed between the coupling and the hose.

Whenever it is desired to remove the coupling, as for example, when the hose becomes broken or worn near the end, this is readily accomplished because the collar may easily be unscrewed and slipped back over the hose and then the main coupling may readily be unscrewed from the metal lining because there has been no distortion of the threaded engagement between the cylindrical sleeve 8 and the metal lining.

The coupling members may readily be formed by a casting or other operation from brass or suitable material and require but little finishing. They are thus easily and cheaply manufactured.

The invention thus presents a simple, economical and efficient coupling for this type of metal lined hose which insures a gas or liquid tight joint and which may be easily placed upon and removed from a hose section.

Having thus described the invention what is claimed as new and desired to be secured by Letters Patent, is:

1. A coupling for metal lined hose, of that type in which the metal lining presents an internal continuous screw thread like groove, comprising an exteriorly screw threaded cylindrical sleeve fitting the said metal lining and its groove, an externally screw threaded body of greater diameter than the sleeve, an intermediate section concentric with and integrally uniting the sleeve and body and having its exterior surface extending in a smooth flare from the sleeve to the body whereby, when the cylindrical sleeve is screwed into the metal lining, the end of the metal-lined hose is forced upon, or upset by, the smooth flare of the intermediate section, and a collar having one end section interiorly screw threaded to fit the externally screw threaded body and the opposite end section presenting a smooth substantially cylindrical interior surface fitting loosely over the hose at the end.

2. A coupling having the construction defined in claim 1 in which the collar is also provided between the said end sections with an annular shoulder concentric with the said body and presenting a rounded shoulder to grip the hose and force it into clamping engagement with a sealing washer between the said body and the hose end.

In testimony whereof, I have signed my name to this specification.

LE ROY H. CRANDALL.